United States Patent
Acero et al.

(10) Patent No.: US 8,065,146 B2
(45) Date of Patent: Nov. 22, 2011

(54) DETECTING AN ANSWERING MACHINE USING SPEECH RECOGNITION

(75) Inventors: Alejandro Acero, Bellevue, WA (US); Craig M. Fisher, Kirkland, WA (US); Dong Yu, Kirkland, WA (US); Ye-Yi Wang, Redmond, WA (US); Yun-Cheng Ju, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1062 days.

(21) Appl. No.: 11/485,011

(22) Filed: Jul. 12, 2006

(65) Prior Publication Data

US 2008/0015846 A1 Jan. 17, 2008

(51) Int. Cl.
*G10L 17/00* (2006.01)
(52) U.S. Cl. .......................... 704/247; 704/235
(58) Field of Classification Search .................. 704/247, 704/235
See application file for complete search history.

(56) References Cited

U.S. PATENT DOCUMENTS

| | | | |
|---|---|---|---|
| 4,941,168 A | 7/1990 | Kelly, Jr. | |
| 5,371,787 A | 12/1994 | Hamilton | 379/386 |
| 5,581,602 A | 12/1996 | Szlam et al. | 379/67 |
| 5,644,624 A | 7/1997 | Caldwell | |
| 5,724,420 A | 3/1998 | Torgrim | 379/372 |
| 5,828,731 A * | 10/1998 | Szlam et al. | 379/88.16 |
| 6,161,087 A * | 12/2000 | Wightman et al. | 704/215 |
| 6,233,319 B1 | 5/2001 | Cox et al. | |
| 6,324,262 B1 | 11/2001 | Tuttle | |
| 6,496,799 B1 * | 12/2002 | Pickering | 704/235 |
| 6,574,601 B1 * | 6/2003 | Brown et al. | 704/270.1 |
| 6,850,602 B1 | 2/2005 | Chou | 379/80 |
| 7,162,421 B1 * | 1/2007 | Zeppenfeld et al. | 704/233 |
| 7,567,659 B2 | 7/2009 | Kumagai | |
| 2002/0085686 A1 | 7/2002 | Cullis | |
| 2003/0083874 A1 * | 5/2003 | Crane et al. | 704/246 |
| 2003/0086541 A1 | 5/2003 | Brown | |
| 2005/0013418 A1 * | 1/2005 | Chang et al. | 379/45 |
| 2005/0027527 A1 | 2/2005 | Junkawitsch et al. | |
| 2005/0119886 A1 | 6/2005 | Walker | |
| 2005/0256711 A1 | 11/2005 | Lahti | |
| 2005/0276390 A1 | 12/2005 | Sikora et al. | |

(Continued)

FOREIGN PATENT DOCUMENTS

KR 10 2006 0077505 7/2006

OTHER PUBLICATIONS

Official Search Report of the European Patent Office in counterpart foreign application No. PCT/US2007/011567 filed May 15, 2007.

(Continued)

*Primary Examiner* — Jakieda Jackson
(74) *Attorney, Agent, or Firm* — Steven M. Koehler; Westman, Champlin & Kelly, P.A.

(57) ABSTRACT

An answering machine detection module is used to determine whether a call recipient is an actual person or an answering machine. The answering machine detection module includes a speech recognizer and a call analysis module. The speech recognizer receives an audible response of the call recipient to a call. The speech recognizer processes the audible response and provides an output indicative of recognized speech. The call analysis module processes the output of the speech recognizer to generate an output indicative of whether the call recipient is a person or an answering machine.

20 Claims, 6 Drawing Sheets

U.S. PATENT DOCUMENTS

| | | | | |
|---|---|---|---|---|
| 2006/0056600 A1* | 3/2006 | Merrow et al. | ............ | 379/88.02 |
| 2006/0177021 A1* | 8/2006 | Delaney et al. | ............ | 379/88.13 |
| 2006/0235694 A1* | 10/2006 | Cross et al. | ................ | 704/270.1 |
| 2008/0154595 A1* | 6/2008 | Nelken | ......................... | 704/240 |

OTHER PUBLICATIONS http://www.vxml.org/frame.jsp?page=ansdetection.htm.
http://www.databasesystemscorp.com/acdreports.htm.

The State Intellectual Property Office of the People's Republic of China, Notice on the First Office Action, Jan. 19, 2011, pp. 1-17.
Corresponding European Office Action, Serial No. 07777047.7, filed May 15, 2007, office action mailed Mar. 22, 2011, pp. 1-2.
Corresponding Russian Office Action from the Patent Office of the Russian Federation, mailed Apr. 19, 2011 for Russian Application No. 2009100152, pp. 1-10.

* cited by examiner

DETECTING AN ANSWERING MACHINE USING SPEECH RECOGNITION

BACKGROUND

The discussion below is merely provided for general background information and is not intended to be used as an aid in determining the scope of the claimed subject matter.

Use of automated outbound telephone calling systems is quite common. Besides being used for marketing purposes, such systems can also be used by doctor offices or clinics to contact patients to confirm or change appointments, by schools to inform students of schedule changes, by charities to obtain contributions, and governmental agencies to provide notification or other information, to name just a few other applications.

In many instances, it may be necessary or helpful to automatically ascertain whether the recipient of the telephone call is an actual person or an answering machine. Depending on whether an actual person has answered or an answering machine is in use, different actions may be taken by the outbound telephone calling system. However, this task, call analysis, is difficult and currently inaccurate.

Call analysis is commonly performed at the hardware switch level. Analysis is implemented by using a short interval when the recipient initially picks up the call and before the call is connected to the telephony application. During this interval, when the recipient begins to speak, the system will process the received audible signals as to, for example, energy content, strength or other signal parameters of the audible signals, in order to make a determination as to whether the recipient is an actual person or answering machine. It is important to understand that the telephony application does not even know the call has been picked up at this step, and therefore, has not delivered any initial prompts. Thus, on the other end of the line, although the recipient has answered the call and given a greeting such as "Hello", the recipient only hears silence in return as the system is performing call analysis. In many instances, the recipient will then simply hang up.

SUMMARY

The Summary and Abstract are provided to introduce a selection of concepts in a simplified form that are further described below in the Detailed Description. The Summary and Abstract are not intended to identify key features or essential features of the claimed subject matter, nor are they intended to be used as an aid in determining the scope of the claimed subject matter. In addition, the claimed subject matter is not limited to implementations that solve any or all disadvantages noted in the background.

An answering machine detection module is used to determine whether a call recipient is an actual person or an answering machine. The answering machine detection module includes a speech recognizer and a call analysis module. The speech recognizer receives an audible response of the call recipient to a call. The speech recognizer processes the audible response and provides an output indicative of recognized speech. The call analysis module processes the output of the speech recognizer to generate an output indicative of whether the call recipient is a person or an answering machine. In one embodiment, the call analysis module can include a classifier module that provides statistical analysis of the output from the speech recognizer to determine whether a call recipient is an actual person or an answering machine.

Also described is a technique for ensuring that the entire message from the caller is recorded by the answering machine. In particular, a speech recognizer is operated to detect barge in events by the answering machine, and where the message is replayed to the answering machine if a barge-in event is detected. Although this may cause the message to be replayed one or more times, it is particularly advantageous since any barge-in event signifies that the greeting of the answering machine has not finished, and thus the answering machine is not ready to record a message. By replaying the message after each barge-in event, upon playing the message after the last barge-in event it is assured the entire message will be recorded when the answering machine is ready to record the message.

DETAILED DESCRIPTION

Figure 1:
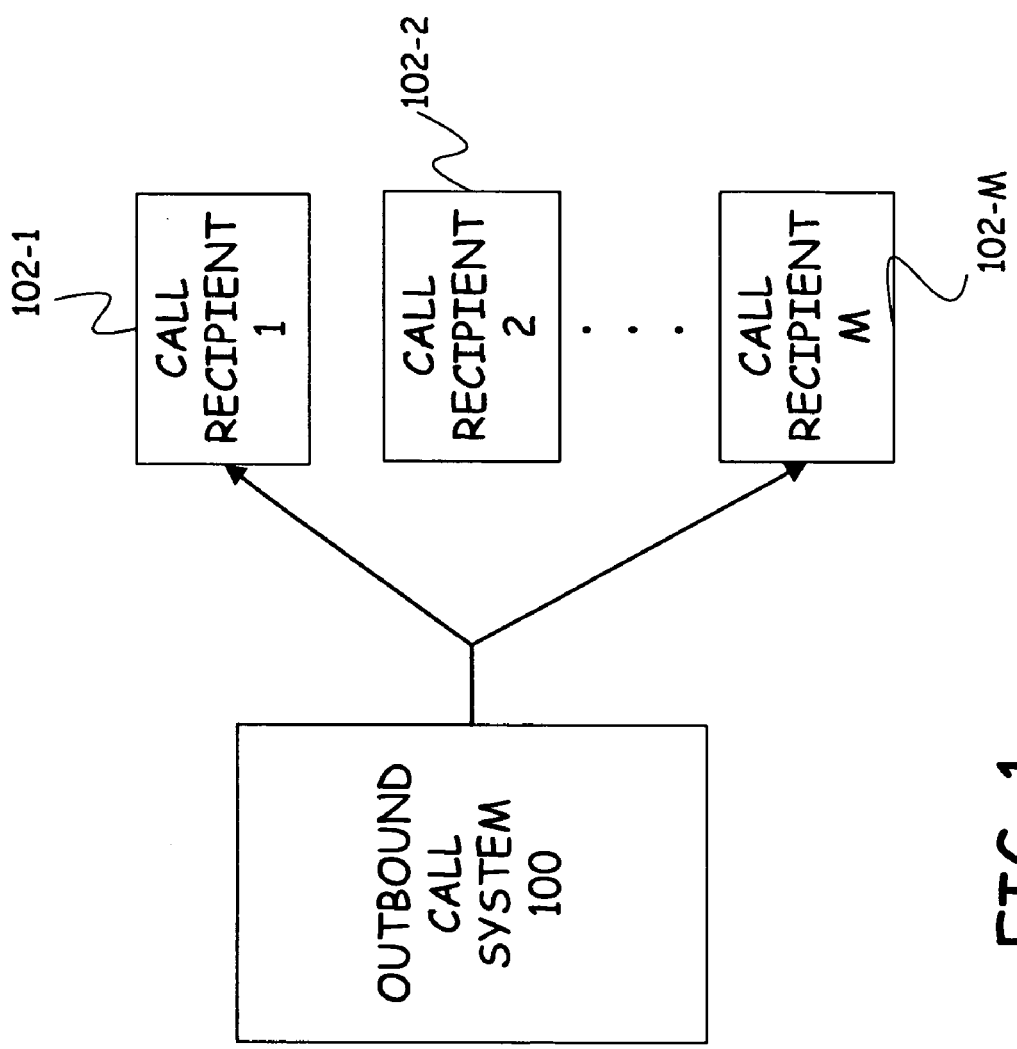
FIG. 1 is a schematic block diagram representation of a dialing system.
Figure 2:
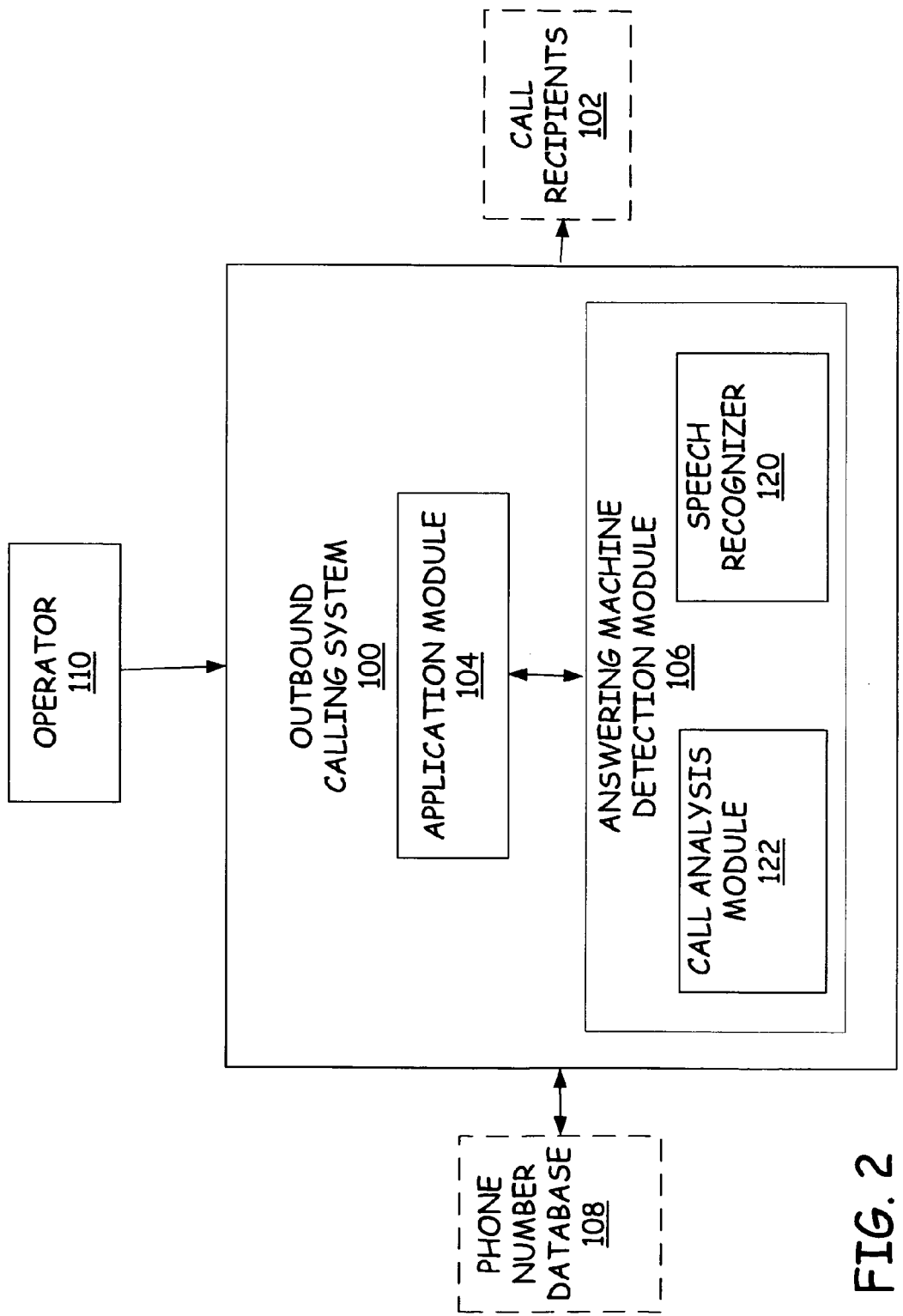
FIG. 2 is a schematic block diagram representation of components of the dialing system shown in FIG. 1.

FIGS. 1 and 2 are schematic block diagrams of an outbound calling or dialing system 100. System 100 is illustratively implemented within one of the computing environments discussed in association with FIG. 6 discussed below, or within other suitable computing environments. As illustrated in FIG. 1, outbound calling system 100 places calls to any one or a plurality of call recipients 102 (call recipients 102-1 through 102-M are illustrated). As used herein, a "call recipient" can be either an actual person or an answering machine. After placing a call to one of the call recipients 102-1 through 102-M, outbound calling system 100 ascertains whether the call recipient is an actual person or whether an answering machine is in use.

FIG. 2 illustrates in greater detail components or modules of outbound calling system 100 in accordance with one exemplary embodiment. As illustrated, outbound calling system 100 makes calls to one or more call recipients 102. An answering machine detection module 106 is used to determine whether the call recipient 102 is an actual person or an answering machine. In a typical application, an application module 104 initiates dialing of a call recipient's telephone number retrieved from, for example, a database of phone numbers 108. Answering machine detection module 106 is then used to ascertain if the call recipient 102 is an actual person or answering machine. Different actions will be taken by the outbound calling system 100 according to the output of detection module 106. For example, if the call recipient is an actual person, application module 104 may then transfer the call to an operator 110, or engage the recipient in an automatic conversation. Otherwise, application module 104 may be used to leave a message on the answering machine of the call recipient 102. In FIG. 2, call recipients 102, phone number database 108 and operator 110 are shown in dashed lines to illustrate that they are not themselves part of, or necessarily needed in the outbound calling system 100. Furthermore, the block diagram of outbound calling system 100 is schematic for purposes of understanding and in order to provide an exemplary relationship between answering machine detection module 106 and its components thereof, as well as other components of outbound calling system 100. It should be understood that this is but one exemplary embodiment in that one or more components of outbound calling system 100 and answering machine detection module 106 may be omitted and/or combined in other configurations in yet other embodiments.

Figure 3:
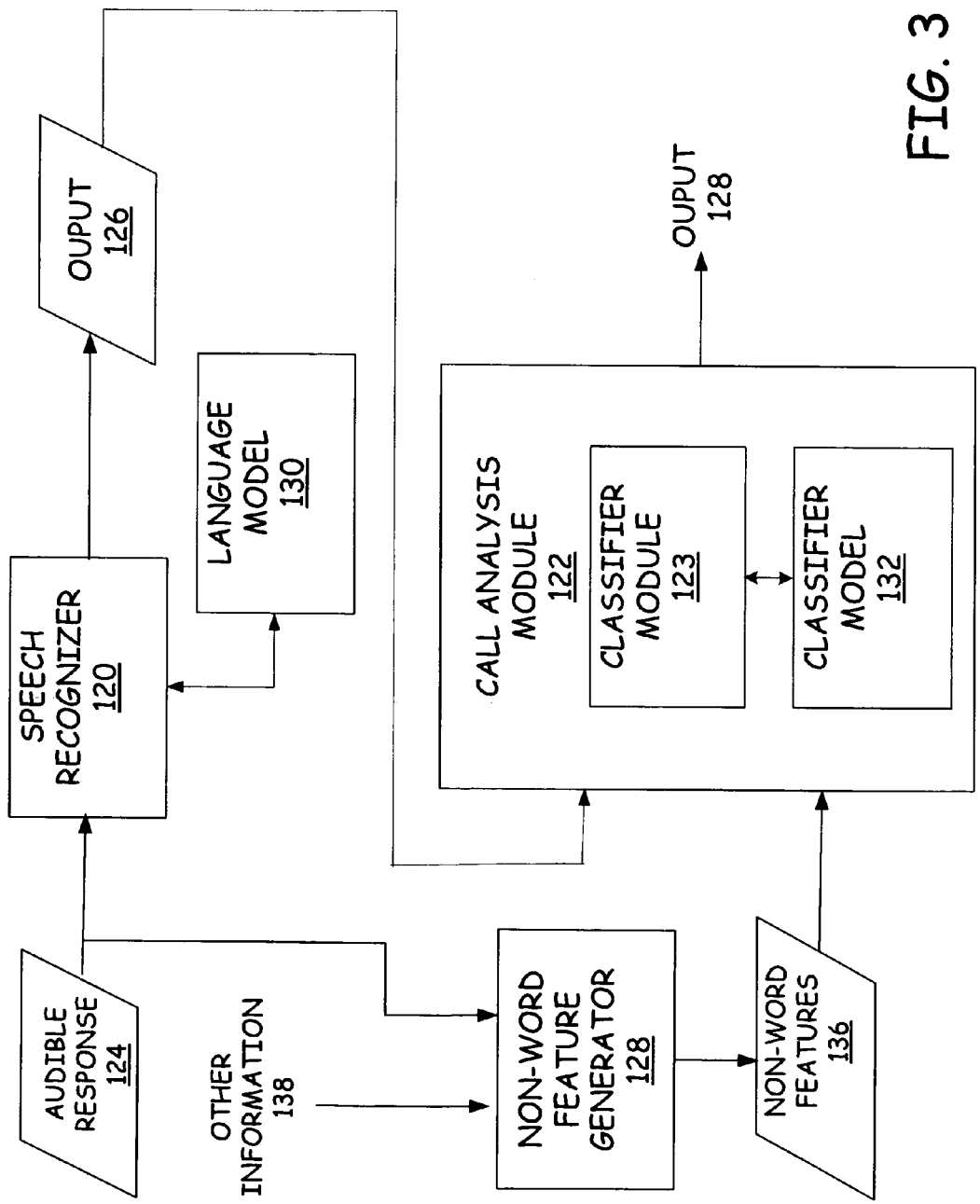
FIG. 3 is a schematic block diagram for processing a call.
Figure 4:
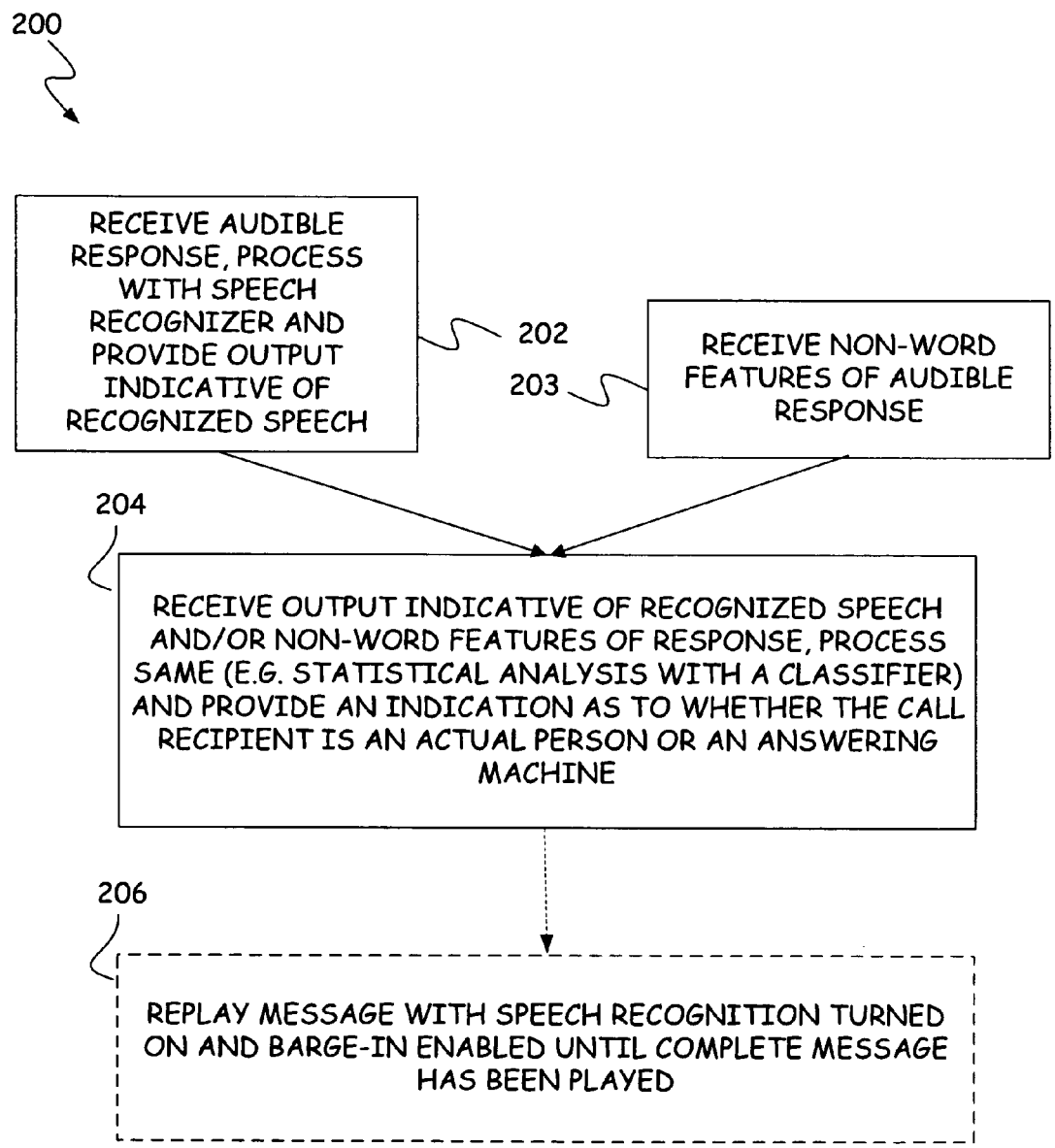
FIG. 4 is a flow chart for processing a call.

In the embodiment illustrated, answering machine detection module 106 includes a speech recognizer 120 and a call analysis module 122. FIGS. 3 and 4 are a schematic diagram and flowchart of a method 200, respectively, illustrating operation of these modules. At step 202, the speech recognizer 120 receives the audible response 124 of the call recipient 102 to the call placed by outbound calling system 100. Speech recognizer 120 processes the audible response 124 and provides an output 126 indicative of recognized speech, and in one embodiment phrases, commonly in the form of textual data. As used herein a phrase is a plurality of words in context as provided by the call recipient.

At step 204, the output 126 from the speech recognizer 120 is provided as input to the call analysis module 122. The call analysis module 122 processes the output 126 of the speech recognizer 120 to generate an output 128 indicative of whether the call recipient is a person or an answering machine. The call analysis module 122 can include a classifier module 123 that provides statistical analysis of the content of the phrase(s) in output 126. The speech recognizer 120 and the classifier module 123 are well known modules and can be implemented using a variety of well known techniques. However, it should be noted that a language model 130 (e.g. N-gram, context-free-grammar, hybrid, etc.) used by the speech recognizer 120 and a classifier model 132 are typically both trained on only phrases or greetings used by both actual persons and answering machines when they answer a call. For instance, a person may answer a phone call with the greeting "Hello", "How may I help you?", "This is Steve" or maybe just their name. In contrast, an answering machine may have the greeting "You have reached my answering machine. I am unavailable at the moment. Please leave a message." or simply "Please leave a message". However, in content-based answering machine detection, it may be necessary to recognize important phrases such as "not available right now" or "leave a message". Likewise, in the case of passing a phone screen system at the receiving location, it may be necessary to recognize phrases like "press 2". For high recognition accuracy on phrases such as these, the language model 130 can be trained with the important phrases and where the model can be smoothed with an n-gram filler model to capture the words not covered in the important phrases. An example of an n-gram filler model is described by D. Yu, Y.-C. Ju, Y. Wang and A. Acero in "N-Gram Based Filler Model for Robust Grammar Authoring," published In *Proceedings of the International Conference on Acoustics, Speech, and Signal Processing*, May 2006. Using a sufficient number of examples (either generic examples or application specific examples) both the language model 130 and the classifier model 132 can be suitably trained.

With respect to the call analysis module 122 and step 204, non-word features 136 can also be used for analysis in addition or in the alternative to the output 126 of the speech recognizer 120. Examples of non-word features 136 include but are not limited to whether the call recipient 102 "barged-in" (i.e., interrupted a prompt being played when the application 104 is executing a dialog), the duration of the audible response made by the call recipient 102 in answering the call, and whether or not the speech recognizer 120 was able to recognize the audible response 124 as a valid phrase. In FIG. 3, non-word features 136 are produced from a non-word feature generator 128, which can receive and process audible response 124 or other input information 138 pertaining to the call from outbound calling system 100. In FIG. 4, receipt of the non-word features 136 is indicated at step 203.

At this point, it should also be noted that there is no requirement that the speech recognizer 120 be able to recognize the complete audible response 124, but rather, due to the noisy environment at the call recipient 102, noise in a recorded greeting or noise from the telephone system, and the nature of the response, only one or more portions of the audible response 124 may be recognizable, and thus, used for ascertaining whether the call recipient 102 is an actual person or answering machine.

Figure 5:
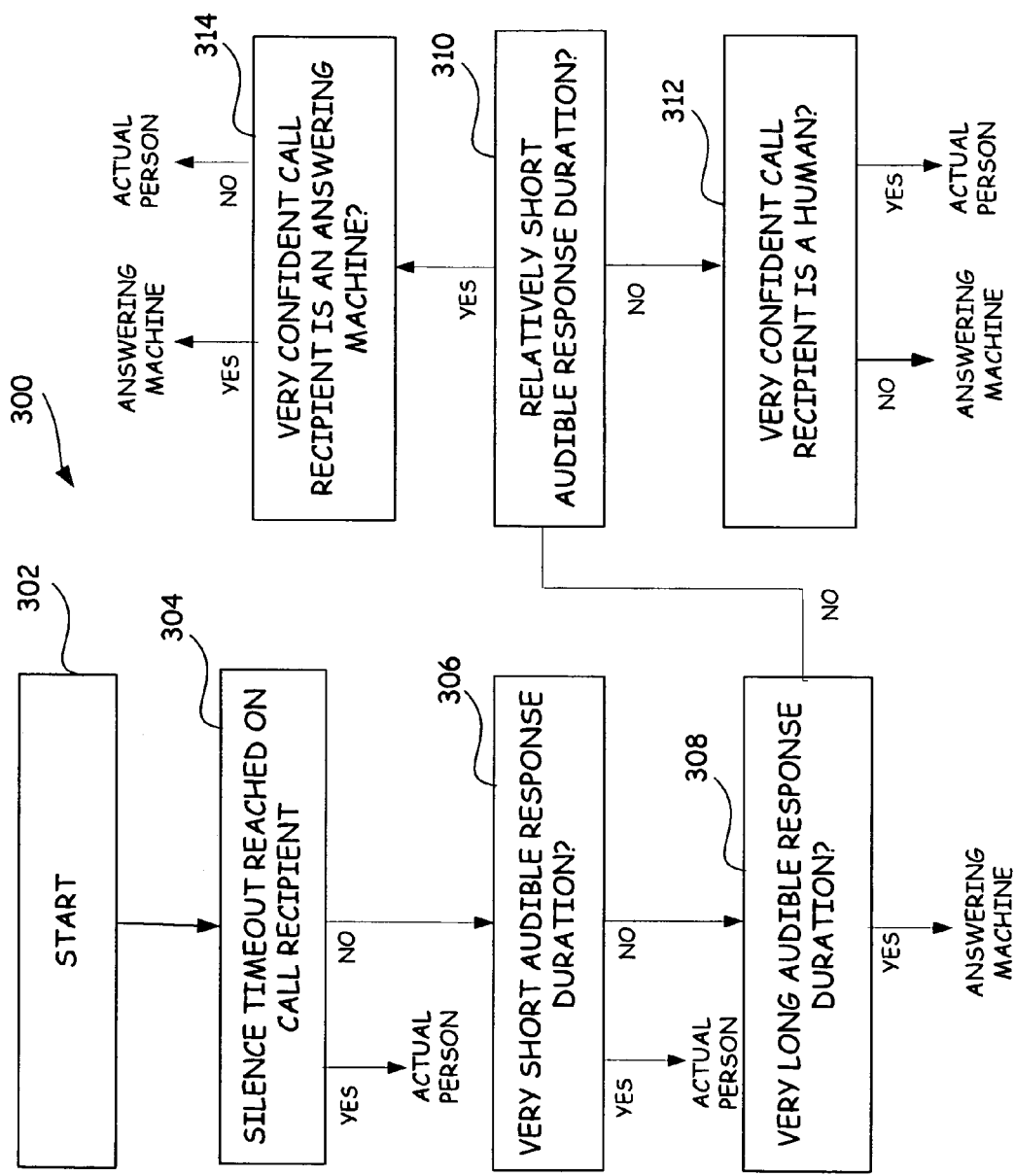
FIG. 5 is a more detailed flow chart for processing the call.

FIG. 5 is a flowchart illustrating an exemplary method 300 performed by call analysis module 122 in executing step 204 in FIG. 3. Step 302 represents the beginning of speech recognition after the call has been placed. A first non-word feature that can optionally be used for ascertaining whether the recipient is an actual person or answering machine is whether silence is initially present once the call has been picked up. In particular, it has been found that an actual person may wait, for example, one or two seconds, before beginning to speak. Thus, if at step 304 it is determined significant silence is present after the call has been picked up, for instance as measured by a timer exceeding a selected time from step 302, a determination can be made that the call recipient 102 is an actual person.

If on other hand significant silence is not present after the call has been picked up at step 302, or step 302 is not present, the duration of the audible response can be used to determine whether or not the call recipient is an actual person. Steps 306 and 308 illustrate processing the non-word feature comprising the duration of the audible response. At step 306, if the duration of the audible response is very short (for example, approximately less than 1 second), it is more than likely an actual person who has answered the call. In contrast, if the duration of the audible response is very long (for example, approximately four or more seconds) as illustrated by step 308, the call recipient is probably an answering machine. It should be noted the order in which steps 306 and 308 are illustrated is not necessary in that these steps can be reversed. Likewise the time periods specified can be adjusted.

If a determination of whether the call recipient is an actual person or answering machine has not been made prior to step 308, process flow continues to step 310 whereat the duration of the audible response can again be used. In particular, at step 310 the duration of the audible response is measured to determine if it is relatively short, for example, two to three seconds. The result of this step is combined with information related to the context of the audible response as recognized by the speech recognizer 120 such as obtained from the classifier module 123. In other words, the classifier module 123 analyzes the output 126 from the speech recognizer 120 to determine if one or more phrases are statistically consistent with phrases used by an actual person or phrases used by an answering machine. In FIG. 5, information from the classifier module 123 is represented at steps 312 and 314. In particular, if at step 312 the information from the classifier module 123 indicates that phrases in the audible response are very likely (high confidence) from an actual person, the output 128 of the call analysis module 122 would indicate that the call recipient 102 is an actual person. In contrast, if at step 312 there is not high confidence of the call recipient to be an actual person, the output of the call analysis module 122 would indicate that the call recipient 102 is an answering machine. Similarly, at step 314, if the information from the classifier module 123 indicates that phrases in the audible response are very likely from an answering machine, the output of the call analysis module 122 would indicate that the call recipient is an answering machine, whereas if high confidence that the call recipient is an answering machine is not present, the output of the call analysis module 122 would indicate that the call recipient 102 is an actual person. It should be noted that in this example there is a bias to error on the side of misclassifying a call recipient as an actual person rather than as an answering machine. If desired, the bias can be toward classifying the call recipient as an answering machine, or having no bias at all according to the costs associated with different errors.

Please note that the statistical classifier described above is just an illustrative example. Call analysis module 122 can use many other classifiers, such as maximum entropy classifiers. Furthermore, call analysis module 122 can also use support vector machines, components utilizing decision trees, and artificial neural networks to achieve comparable accuracy.

In the example of FIG. 5, non-word features such as presence of silence after the call has been picked up by the recipient and the duration of the audible response were used prior to actual classifying the content of the audible response in order to ascertain whether the call recipient is an actual person or answering machine. Again, other non-word features such as whether the recipient barged-in or whether the speech recognizer 120 was able to recognize the audible response could also be used. In addition, a classifier could be trained based on the non-word feature(s) and used with the classifier 123 providing an output based on recognized phrases of the audible response to provide an indication as to whether the call recipient is an actual person or answering machine. Likewise, a single classifier could be trained based on the non-word feature(s) and the recognize phrases of the audible response to provide an indication as to whether the call recipient is an actual person or answering machine.

In some applications, it may be necessary to play a message to the call recipient, for instance, if it has been determined that the call recipient is an answering machine. Although answering machines provide a tone or silence signifying that the greeting has ended and that a message should now be left, recognition of this tone is difficult. In many cases since the tone or silence may not be recognized accurately, at least part of the message may be played during the greeting, thus, the beginning portion of the message may not be recorded.

An optional step 206 illustrated in FIG. 4 comprising also another aspect herein described provides means and a technique for ensuring that the entire message is recorded by the answering machine or, if desired, heard by the actual person. In particular, the message is replayed with this speech recognizer 120 turned on and "barge-in" enabled (so as to detect the completion of the greeting) until the message has been completed. For example, assume that an answering machine provides the greeting "You have reached . . . Eric Moe . . . Please leave a message," where " . . . " represents silence during the greeting. In many current systems, the message may be played upon detection of one of these periods of silence, whereby the message would then be played but not recorded since the answering machine has not reached the end of the greeting. Using the technique herein described, the speech recognizer 120 with barge-in enabled would detect each portion of the greeting and cause the message to be started over again. Once the greeting has definitely reached its end, the message is replayed but now this time until its completion so as to ensure that the message was heard or recorded in its entirety.

Figure 6:
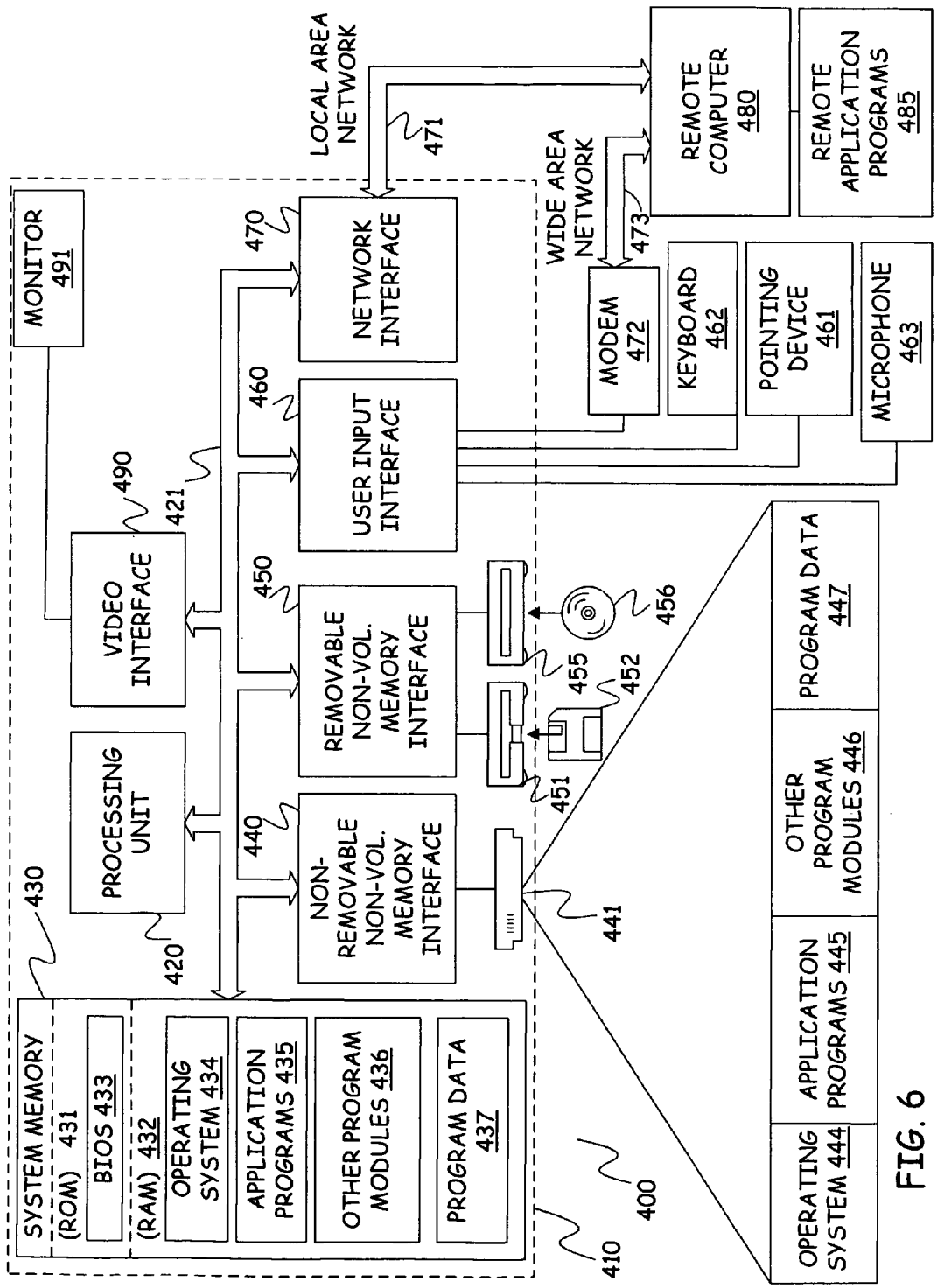
FIG. 6 is an exemplary computing environment.

FIG. 6 illustrates an example of a suitable computing system environment 400 on which the concepts herein described may be implemented. In particular, a form of the computing system environment 400 can be used for outbound calling system 100 or portions thereof. Nevertheless, the computing system environment 400 is again only one example of a suitable computing environment for each of these computers and is not intended to suggest any limitation as to the scope of use or functionality of the description below. Neither should the computing environment 400 be interpreted as having any dependency or requirement relating to any one or combination of components illustrated in the exemplary operating environment 400.

In addition to the examples herein provided, other well known computing systems, environments, and/or configurations may be suitable for use with concepts herein described. Such systems include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The concepts herein described may be embodied in the general context of computer-executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of computer readable media discussed below.

The concepts herein described may also be practiced in distributed computing environments where tasks are performed by remote processing devices that are linked through a communications network. In a distributed computing environment, program modules may be located in both locale and remote computer storage media including memory storage devices.

With reference to FIG. 6, an exemplary system includes a general purpose computing device in the form of a computer 410. Components of computer 410 may include, but are not limited to, a processing unit 420, a system memory 430, and a system bus 421 that couples various system components including the system memory to the processing unit 420. The system bus 421 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

Computer 410 typically includes a variety of computer readable media. Computer readable media can be any available media that can be accessed by computer 410 and includes both volatile and nonvolatile media, removable and non-removable media. By way of example, and not limitation, computer readable media may comprise computer storage media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 400.

The system memory 430 includes computer storage media in the form of volatile and/or nonvolatile memory such as read only memory (ROM) 431 and random access memory (RAM) 432. A basic input/output system 433 (BIOS), containing the basic routines that help to transfer information between elements within computer 410, such as during start-up, is typically stored in ROM 431. RAM 432 typically contains data and/or program modules that are immediately accessible to and/or presently being operated on by processing unit 420. By way of example, and not limitation, FIG. 6 illustrates operating system 434, application programs 435, other program modules 436, and program data 437. Herein, the application programs 435, program modules 436 and program data 437 implement one or more of the concepts described above.

The computer 410 may also include other removable/non-removable volatile/nonvolatile computer storage media. By way of example only, FIG. 6 illustrates a hard disk drive 441 that reads from or writes to non-removable, nonvolatile magnetic media, a magnetic disk drive 451 that reads from or writes to a removable, nonvolatile magnetic disk 452, and an optical disk drive 455 that reads from or writes to a removable, nonvolatile optical disk 456 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 441 is typically connected to the system bus 421 through a non-removable memory interface such as interface 440, and magnetic disk drive 451 and optical disk drive 455 are typically connected to the system bus 421 by a removable memory interface, such as interface 450.

The drives and their associated computer storage media discussed above and illustrated in FIG. 6, provide storage of computer readable instructions, data structures, program modules and other data for the computer 410. In FIG. 6, for example, hard disk drive 441 is illustrated as storing operating system 444, application programs 445, other program modules 446, and program data 447. Note that these components can either be the same as or different from operating system 434, application programs 435, other program modules 436, and program data 437. Operating system 444, application programs 445, other program modules 446, and program data 447 are given different numbers here to illustrate that, at a minimum, they are different copies.

A user may enter commands and information into the computer 410 through input devices such as a keyboard 462, a microphone 463, and a pointing device 461, such as a mouse, trackball or touch pad. These and other input devices are often connected to the processing unit 420 through a user input interface 460 that is coupled to the system bus, but may be connected by other interface and bus structures, such as a parallel port or a universal serial bus (USB). A monitor 491 or other type of display device is also connected to the system bus 421 via an interface, such as a video interface 490.

The computer 410 may operate in a networked environment using logical connections to one or more remote computers, such as a remote computer 480. The remote computer 480 may be a personal computer, a hand-held device, a server, a router, a network PC, a peer device or other common network node, and typically includes many or all of the elements described above relative to the computer 410. The logical connections depicted in FIG. 6 include a locale area network (LAN) 471 and a wide area network (WAN) 473, but may also include other networks. Such networking environments are commonplace in offices, enterprise-wide computer networks, intranets and the Internet.

When used in a LAN networking environment, the computer 410 is connected to the LAN 471 through a network interface or adapter 470. When used in a WAN networking environment, the computer 410 typically includes a modem 472 or other means for establishing communications over the WAN 473, such as the Internet. The modem 472, which may be internal or external, may be connected to the system bus 421 via the user-input interface 460, or other appropriate mechanism. In a networked environment, program modules depicted relative to the computer 410, or portions thereof, may be stored in the remote memory storage device. By way of example, and not limitation, FIG. 6 illustrates remote application programs 485 as residing on remote computer 480. It will be appreciated that the network connections shown are exemplary and other means of establishing a communications link between the computers may be used.

It should be noted that the concepts herein described can be carried out on a computer system such as that described with respect to FIG. 6. However, other suitable systems include a server, a computer devoted to message handling, or on a distributed system in which different portions of the concepts are carried out on different parts of the distributed computing system.

Although the subject matter has been described in language specific to structural features and/or methodological acts, it is to be understood that the subject matter defined in the appended claims is not limited to the specific features or acts described above as has been held by the courts. Rather, the specific features and acts described above are disclosed as example forms of implementing the claims.

What is claimed is:

1. A computer-implemented method of ascertaining whether a call recipient is an actual person or an answering machine, the method comprising, with a processor:
    receiving an audible response from a call recipient and processing the audible response with a speech recognizer having a language model to convert the audible response to an output indicative of recognized speech in a textual form; and
    processing the output indicative of recognized speech in the textual form with a statistical classifier trained on word phrases commonly used by actual persons and on word phrases commonly used by automated systems along with ascertaining non-word features associated with the audible response to provide an output indicative of whether the call recipient is an actual person or an answering machine, wherein said classifier is separate from said language model, said processing being based on a statistical analysis of the output indicative of recognized speech in the textual form along with the non-word features, the statistical analysis examining the content of the output indicative of recognized speech and based on that examination determining whether the output indicative of recognized speech is more statistically consistent with the word phrases commonly used by actual persons or with the word phrases commonly used by automated systems.

2. The computer-implemented method of claim 1 wherein processing includes ascertaining a duration of the audible response and using the duration of the audible response as a basis to provide an output indicative of whether the call recipient is an actual person or an answering machine, and wherein the a model of the statistical classifier is smoothed to capture words not included in the word phrases commonly used by actual persons and in the word phrases commonly used by automated systems.

3. The computer-implemented method of claim 2 wherein processing includes using statistical analysis when the duration of the utterance is within a selected range, and wherein the language model is smoothed utilizing an n-gram filler model.

4. The computer-implemented method of claim 1 wherein processing includes ascertaining whether silence is initially present in the audible response and using the presence of silence as a basis to provide an output indicative of whether the call recipient is an actual person or an answering machine, and wherein the language model is an n-gram language model.

5. The computer-implemented method of claim 4 wherein processing includes ascertaining whether silence of a period relative to a selected length is initially present in the audible response and using the presence of silence as a basis to provide an output indicative of whether the call recipient is an actual person or an answering machine, and wherein processing the audible response with a speech recognizer to convert the audible response to an output indicative of recognized speech in a textual form comprises the speech recognizer only recognizing a portion of the audible response.

6. The computer-implemented method of claim 1 wherein processing includes using an indication as to whether the speech recognizer was able to recognize any speech in the audible response as a basis to provide an output indicative of whether the call recipient is an actual person or an answering machine, and wherein processing the audible response with a speech recognizer to convert the audible response to an output indicative of recognized speech in a textual form comprises the speech recognizer recognizing every portion of the audible response.

7. The computer-implemented method of claim 1 wherein processing includes using statistical analysis when a duration of the utterance is within a selected range, and wherein the language model is a context-free-grammar model.

8. The computer-implemented method of claim 1 wherein processing includes at least one of: ascertaining a duration of the audible response and using the duration of the audible response as a basis to provide an output indicative of whether the call recipient is an actual person or an answering machine; ascertaining whether silence is initially present in the audible response and using the presence of silence as a basis to provide an output indicative of whether the call recipient is an actual person or an answering machine; ascertaining whether silence of a period relative to a selected length is initially present in the audible response and using the presence of silence as a basis to provide an output indicative of whether the call recipient is an actual person or an answering machine; or using an indication as to whether the speech recognizer was able to recognize any speech in the audible response as a basis to provide an output indicative of whether the call recipient is an actual person or an answering machine; and wherein processing includes using statistical analysis when the duration of the utterance is within a selected range.

9. A computer readable storage medium being a hardware computer storage medium and having instructions which when implemented by a computer ascertain whether a call recipient is an actual person or an answering machine, the instructions comprising:
receiving an audible response from a call recipient;
accessing a language model and using speech recognition to convert the audible response to an output indicative of recognized word phrases in textual form; and
processing the output indicative of recognized word phrases in textual form to provide an output indicative of whether the call recipient is an actual person or an answering machine, said processing being based on statistical analysis of the word phrases used by the call recipient in the audible response and apart from the language model, wherein each of said word phrases comprises a plurality of words, and wherein the statistical analysis includes calculating a confidence level that the output indicative of recognized word phrases corresponds to an actual person and calculating a confidence level that the output indicative of recognized word phrases corresponds to an answering machine, the output indicative of whether the call recipient is an actual person or an answering machine being based at least in part on the calculated confidence levels.

10. The computer readable storage medium of claim 9 wherein processing comprises processing the word phrases with a statistical classifier and using an output from the statistical classifier as a basis to provide an output indicative of whether the call recipient is an actual person or an answering machine, and wherein the output indicative of whether the call recipient is an actual person or an answering machine is biased towards classifying the call recipient as an actual person.

11. The computer readable storage medium of claim 10 wherein processing includes using statistical analysis when the duration of the utterance is within a selected range.

12. The computer readable storage medium of claim 10 and further comprising operating a speech recognizer to detect barge-in events by the call recipient and replaying a message to the call recipient if a barge-in event is detected until the message is played in its entirety.

13. The computer readable storage medium of claim 12 wherein replaying the message to the call recipient comprises replaying the message to the call recipient if the call recipient is the answering machine.

14. The computer readable storage medium of claim 9 wherein processing includes processing the audible response to ascertain non-word features associated with the audible response and using the non-features as a basis to provide an output indicative of whether the call recipient is an actual person or an answering machine, and wherein the output indicative of whether the call recipient is an actual person or an answering machine is biased towards classifying the call recipient as an answering machine.

15. The computer readable storage medium of claim 9 wherein processing includes ascertaining a duration of the audible response and using the duration of the audible response as a basis to provide an output indicative of whether the call recipient is an actual person or an answering machine, and wherein the output indicative of whether the call recipient is an actual person or an answering machine has no bias.

16. The computer readable storage medium of claim 9 wherein processing includes ascertaining whether silence is initially present in the audible response and using the presence of silence as a basis to provide an output indicative of whether the call recipient is an actual person or an answering machine.

17. The computer readable storage medium of claim 16 wherein processing includes ascertaining whether silence of a period relative to a selected length is initially present in the audible response and using the presence of silence as a basis to provide an output indicative of whether the call recipient is an actual person or an answering machine.

18. The computer readable storage medium of claim 9 wherein processing includes using an indication as to whether the speech recognition was able to recognize any speech in the audible response as a basis to provide an output indicative of whether the call recipient is an actual person or an answering machine.

19. The computer readable storage medium of claim 9 wherein processing includes processing the audible response to ascertain non-word features associated with the audible response and using the non-features as a basis to provide an output indicative of whether the call recipient is an actual person or an answering machine, and wherein the non-word features associated with the audible response comprise at least one of a duration of the audible response, the presence of silence in the audible response, and whether the speech recognizer was able to recognize any speech in the audible response, and wherein said statistical analysis is used when the duration of the audible response is within a selected range.

20. A computer-implemented method of leaving a message for a call recipient on an answering machine, the method comprising:
    detecting whether a call recipient is an actual person or the answering machine wherein detecting comprises receiving an audible response from the call recipient and processing the audible response with a processor operating as a speech recognizer having access to a language model to provide an output indicative of recognized speech;
    processing the output indicative of recognized speech to provide an output indicative of whether the call recipient is an actual person or the answering machine, said processing using a statistical classifier trained on word phrases commonly used by actual persons and on word phrases commonly used by automated systems along with ascertaining non-word features associated with the audible response to provide the output indicative of whether the call recipient is an actual person or an answering machine, wherein said classifier is separate from said language model, said processing being based on a statistical analysis of the output indicative of recognized speech in the textual form along with the non-word features, the statistical analysis examining the content of the output indicative of recognized speech and based on that examination determining whether the output indicative of recognized speech is more statistically consistent with the word phrases commonly used by actual persons or with the word phrases commonly used by automated systems; and
if the call recipient is the answering machine, then operating the speech recognizer to detect barge-in events by the answering machine, wherein a barge-in event is detection of a portion of a greeting from the answering machine following a period of silence;
    detecting multiple barge-in events from the answering machine within a single call session; and
    repeatedly restarting a message and playing the message from the beginning to the answering machine upon detection of each of the multiple barge-in events until the message is played in its entirety.

\* \* \* \* \*